United States Patent
Schnegg et al.

[15] 3,674,747
[45] July 4, 1972

[54] PROCESS FOR THE PRODUCTION OF HIGH MOLECULAR WEIGHT LINEAR POLYESTERS

[72] Inventors: Robert Schnegg; Herbert Pelousek, both of Dormagen; Robert Dippolhofer, Leverkusen; Wolfgang Wiegreffe, Krefeld; Hans-Georg Voelz, Krefeld; Gerhard Kienast, Krefeld, all of Germany

[73] Assignee: Farbenfabriken Bayer Aktiengesellschaft, Leverkusen, Germany

[22] Filed: Dec. 17, 1969

[21] Appl. No.: 885,973

[30] Foreign Application Priority Data

Jan. 17, 1969 Germany .......................... P 19 02 175.1

[52] U.S. Cl. ........................... 260/75 R, 252/437, 252/440, 252/461, 252/463, 252/471, 252/472
[51] Int. Cl. ....................................................... C08g 17/015
[58] Field of Search .................................. 260/75, 75 C, 40 P

[56] References Cited

UNITED STATES PATENTS

| | | | |
|---|---|---|---|
| 2,906,737 | 9/1959 | York | 260/75 |
| 2,992,206 | 7/1961 | Youle et al. | 260/75 X |
| 3,055,870 | 9/1962 | McIntyre et al. | 260/75 |
| 3,057,908 | 10/1962 | Gruschke et al. | 260/75 |
| 3,074,913 | 1/1963 | Davies et al. | 260/75 |
| 3,404,121 | 1/1968 | Barkey | 260/75 |

FOREIGN PATENTS OR APPLICATIONS 740,381 11/1955 Great Britain .......................... 260/75

*Primary Examiner*—Melvin Goldstein
*Attorney*—Plumley & Tyner

[57] ABSTRACT

A process for the production of high molecular linear polyesters by polycondensing a glycol with terephthalic acid or a terephthalic acid ester in the presence of a polycondensation catalyst. The condensation catalyst is a titanium-dioxide containing 0.01 to 20% by weight of a metal compound, preferably germanium dioxide and antimonium oxide is used as a metal compound. The catalyst can be prepared by calcinating titanium dioxide together with the metal compound.

6 Claims, No Drawings

PROCESS FOR THE PRODUCTION OF HIGH MOLECULAR WEIGHT LINEAR POLYESTERS

This invention relates to a process for the production of linear high molecular weight polyesters containing a white pigment by polycondensing glycol terephthalates with catalysts incorporated on the titanium dioxide pigments used for the pigmentation.

Hitherto, glycol terephthalates have been polycondensed by the following method: for example, terephthalic acid dimethyl ester and ethylene glycol are transferred in the presence of transesterification catalysts and polycondensed in vacuo following the addition of polycondensation catalysts and matting agents, the pigment and the catalyst being added either separately or mixed with one another before the polycondensation reaction.

It is an object of the invention to produce highly viscous, matted polyglycol terephthalates by using, as the polycondensation catalyst, a titanium dioxide in the anatase or rutile modification containing from 0.01 to 20% by weight of another metal compound acting as catalyst either incorporated in it or precipitated on to it. Oxides, phosphates or sulphates of the elements zinc, cadmium, antimony, copper, manganese, aluminum, magnesium, germanium, lead and cobalt, are used as the metal compounds. It is preferred to use metal oxides in quantities of from 0.1 to 5% by weight. The metal oxides are either added to the titanium dioxide aqueous suspension before calcination or are introduced into the titanium dioxide after it has been calcinated in an after-treatment. In the first method, the metal oxide is incorporated in the titanium dioxide whilst in the second method the metal oxide is precipitated on to the titanium dioxide. The titanium dioxide provided with a metal oxide is added after transesterification in the form of a suspension in glycol or in an inert carrier. The concentration of titanium dioxide in the suspension amounts to between 0.5 and 70% by weight. Coated or calcined metal oxides are used in a quantity sufficient for the polycondensation reaction, i.e. in a quantity of from 0.005 to 0.5% by weight (of metal oxide) based on dimethyl terephthalate or terephthalic acid.

The process is suitable for the continuous production and batch production of polyesters and in particular for the production of polyglycol terephthalates from dimethyl terephthalate and terephthalic acid with ethylene glycol or cyclohexane dimethanol. An appreciable technological advance is embodied in the fact that a synergistic effect is obtained, this being reflected in the fact that the polycondensation times are considerably reduced or higher melt viscosities and hence higher molecular weights are obtained for the same polycondensation times than those obtained in cases where the individual components are used as polycondensation catalysts.

The following Examples illustrate more particularly the invention:

I. — Preparation of the catalysts used in accordance with the invention.

a. 0.40 % of $P_2O_5$ (based on $TiO_2$) in the form of $H_3PO_4$ was was added with continuous stirring to a titanium hydrolysate slurry precipitated and washed in a known manner for the production of titanium dioxide by the sulphate process. After stirring for 1 hour, the sludge was filtered up to a solids content of 38.0%. 0.26% of $K_2O$ (based on $TiO_2$) in the form of a 10% KOH solution and 5% of $GeO_2$ (based on $TiO_2$) in the form of an aqueous suspension of the oxide powder were then added and thoroughly kneaded with the paste. The paste was then dried and had a solids content of 70%. After drying, the product was sized-reduced in a mortar and then calcined in a rotary tube for 1.5 hours at 890° C. The calcine had an apparent density of 700 g/l. It was finely ground in a rotating ball mill. The germanium is either completely or partly incorporated into the crystal lattice of the titanium dioxide by this process.

b. An anatase pigment prepared in a known manner by the sulphate process and ground up was mixed with water to form a 25% suspension and the resulting suspension was heated to 60° C. 0.9% of $SiO_2$ (based on $TiO_2$) in the form of a waterglass solution containing 59.2 g of $SiO_2$/liter were then added with continuous stirring over a period of 15 minutes, followed by another 15 minutes' stirring. 1.5% of $Al_2O_3$ (based on $TiO_2$) in the form of an aqueous $Al_2(SO_4)_3$ solution containing 100 g of $Al_2O_3$ per liter were then added over a period of 15 minutes, followed by another 60 minutes' stirring. The pH value was then adjusted to 5.0 by the addition of a 20% aqueous $NH_3$ solution, followed by another 30 minutes' stirring. 1.05% of $P_2O_5$ (based on $TiO_2$) in the form of an aqueous $Na_2HPO$ solution containing 42.5 g/liter were then added over a period of 10 minutes followed, after another 15 minutes' stirring, by the addition of 0.3% of zinc (based on $TiO_2$) in the form of an aqueous 10% $ZnSO_4$ solution. Stirring was continued for another 120 minutes and finally the pH value was adjusted to 7.1 with the $NH_3$ solution (see above) in order to completely to precipitate the zinc phosphate (catalyst). The product was then filtered using suction and the filter cake washed with 10 times its quantity by weight of water at 80° C. The filter cake was dried for 15 hours at 150° C and ground in a mortar.

c. A rutile pigment prepared in known manner by the sulphate process and ground up was mixed with water to form a 25% suspension and the resulting suspension was heated to 60° C. 0.5% of $TiO_2$ (based on $TiO_2$ pigment) in the form of a titanyl sulphate solution containing 120 g of $TiO_2$ per liter were then added with continuous stirring over a period of 15 minutes, followed by another 60 minutes' stirring. 2.8% of NaOH (based on $TiO_2$) in the form of a 50% sodium hydroxide solution were then added over a period of 15 minutes followed by 60 minutes' stirring. 1.0% of $Al_2O_3$ (catalysts [based on $TiO_2$ pigment]) in the form of an $Al_2(SO_4)_3$ solution containing 100 g of $Al_2O_3$ per liter were then added over a period of 15 minutes, followed by 60 minutes' stirring. The pH value was then adjusted to 7.0–7.2 with more $Al_2(SO_4)_3$ solution. (pH-values below 7.0 are corrected to 7.0—7.2 by the addition of 50% sodium hydroxide solution). To adjust to the correct pH-value stirring was continued for 180 minutes. The product was then filtered using suction and the filter cake washed with 10 times its quantity by weight of water at 80° C. The filter cake was dried at 150° C for 15 hours and ground in a mortar.

d. 1% of $SiO_2$ (based on $TiO_2$) in the form of a waterglass solution containing 59.2 g of $SiO_2$ per liter was added with continuous stirring over a period of 15 minutes to a 25% rutile pigment suspension prepared in accordance with Example 3 after it had been heated to 60° C, followed by another 15 minutes' stirring. On completion of the addition, the product has a pH-value of 11.6. 0.4% of Sb (based on $TiO_2$) in the form of an $SbCl_5$ solution containing 299 g of $SbCl_5$ per liter were then added over a period of 10 minutes, followed by another 15 minutes' stirring. In order to completely precipitate the Sb (V) oxide hydrate, 25% sodium hydroxide solution is then added until the pH value is 8.5. After 30 minutes' stirring, the product is filtered by suction, washed, dried and ground as in C).

II. — Preparation of the linear high molecular weight polyesters according to the invention

EXAMPLE 1

80 kg of terephthalic acid dimethyl ester and 70 kg of ethylene glycol were transesterified for 3 hours at 180° C with 60 g of calcium acetate (0.075%) based on dimethyl terephthalate, 711 g of a 48% suspension of anatase with $GeO_2$ according to a) in glycol (approximately 0.426% of $TiO_2$ based on DMT) being added before precondensation. The concentration of germanium dioxide in the pigment amounts to about 4.5% by weight, based on $TiO_2$. After a gradual increase in temperature to 285° C followed by evacuation to 0.1 Torr, the reaction mixture was polycondensed for 2.5 hours at upwards of 1 Torr. A highly viscous matted polyester with the following characteristics is obtained:

| | | |
|---|---|---|
| $\eta rel^*$ | = | 1.64 |
| m.p. | = | 259°C | remission
(at 460 mµ) = 73%
η280° = 3100 poises

*η$_{rel}$ was measured with a 1% by weight solution in m-cresol at 20°C.

COMPARISON EXAMPLES a. 80 kg of terephthalic acid dimethyl ester and 70 kg of ethylene glycol were transesterified for 3 hours at 180° C with 60 g of calcium acetate (0.075% based on DMT), 711 g of a 48. suspension of anatase in ethylene glycol (TiO$_2$ without any metal oxide added to it) [approximately 0.426% of TiO$_2$ based on DMT], being added before precondensation. A gradual increase in temperature to 285° C and evacuation to 0.1 Torr are followed by 2.5 hours' polycondensation at upwards of 1 Torr. A highly viscous matted polyester with the following characteristics is obtained:

ηrel = 1.51
m.p. = 256°C
remission
(at 460 mµ) = 68%
η280 = 1560 poises

*η$_{rel}$ was measured with a 1% by weight solution in m-cresol at 20°C.

It can be seen that a polyester of greatly increased viscosity and better whiteness is obtained according to Example 1 under the same conditions.

b. 80 kg of terephthalic acid dimethyl ester and 70 kg of ethylene glycol were transesterified for 3 hours at 180° C with 60 g of calcium acetate (0.075% based on DMT), 15.2 g (0.019% by weight) of GeO$_2$ and 0.426% by weight of TiO$_2$ being added before precondensation. A gradual increase in temperature to 285° C and evacuation to 0.1 Torr are followed by 2.5 hours' polycondensation at upwards of 1 Torr. A highly viscous polyester with the following characteristics is obtained:

ηrel = 1.56
m.pp = 258°C
remission
(at 460 mµ) = 72%
η280 = 2050 poises

These figures are proof of the synergistic effect of the multi-component catalysts according to Example 1 used in accordance with the invention in comparison with an ordinary mixture of the catalyst components.

EXAMPLE 2

80 kg of terephthalic acid dimethyl ester and 70 kg of ethylene glycol are transesterified for 3 hours at 180° C with 60 g of calcium acetate (0.075% based on DMT), 711 g of a suspension (48% by weight) of anatase pigment similar to Example 2 coated with zinc phosphate (ZnO concentration in the pigment approximately 4.5% by weight based on TiO$_2$) in ethylene glycol being added before precondensation. A gradual increase in temperature to 285° C and evacuation to 0.1 Torr were followed by 2.5 hours' polycondensation at upwards of 1 Torr. A highly viscous matted polyester with a satisfactory grain size distribution is obtained:

ηrel = 1.58
m.p. = 258°C
remission*
(460 mµ) = 69%
η280 = 2400 poises

*Remission degree was determined

EXAMPLE 3

80 kg of terephthalic acid dimethyl ester and 70 kg of ethylene glycol were transesterified for 3 hours at 180° C with 60 g of calcium acetate (0.075% based on DMT), 711 g of a suspension (48% by weight) of rutile pigment coated with Sb (V) oxide hydrate (2% by weight of Sb$_2$O$_5$ based on TiO$_2$) in ethylene glycol being added before precondensation. A gradual increase in temperature to 285° C and evacuation to 0.1 Torr were followed by 2.5 hours' polycondensation at upwards of 1 Torr. A highly viscous matted polyester with a satisfactory grain size distribution is obtained:

ηrel = 1.61
m.p. = 261°C
remission
(at 460 mµ) = 68%
η280 = 2800 poises

*Remission degree was determined

EXAMPLE 4

10 kg of terephthalic acid dimethyl ester and 8 kg of ethylene glycol/hour were continuously transesterified at 175° C with a solution of 0.05% by weight of zinc acetate in a continuous transesterification cascade, and on completion of transesterification a 48% suspension (89 g/hour) of anatase with GeO$_2$ (according to Example 1) in glycol (approximately 0.43% of TiO$_2$ based on DMT) is continuously added through metering pumps so that a concentration of 0.019% by weight of GeO$_2$ is adjusted in the melt (concentration of GeO$_2$ in the anatase approximately 4.5% by weight). After continuous precondensation in a screw reactor, condensation is completed in a polycondensation screw (280° C; 0.1 Torr; residence time 1.5 hours).

ηrel = 1.64
m.p. = 258°C
remission = 72.0%

EXAMPLE 5

50 kg of terephthalic acid are esterified for 2 hours under pressure at 240° C in an autoclave with 40 kg of ethylene glycol and 25 g of zinc acetate, and the steam continuously injected at 5 atms. After reaching normal pressure, 445 g of a suspension (48%) of anatase with GeO$_2$ according to Example 1 in glycol are added (approximately 0.43% of TiO$_2$ based on TS). The concentration of GeO$_2$ in the pigment amounts to 4.5% by weight. The temperature is increased in stages to 75° C whilst at the same time the autoclave is evacuated to a pressure of 1 Torr (2.5 hours at upwards of 1 Torr)

ηrel = 1.71
m.p. = 250°C
remission = 69.0%

EXAMPLE 6

2,5 kg (17,4 mol) of 1,4-cyclohexanedimethanol, 1,3 kg (6,7 mol) of dimethylterephthalate were transesterified for 3 hours at 200° C in the presence of 1,3 g (0.1% by weight calculated on dimethylterephthalate). The temperature is raised for 15 minutes to 220° C and 11,08 g of a suspension (50% by weight) of the catalyst prepared according Ia) are added. The titan content was approximately 0.426% by weight of titaniumdioxide based on dimethylterephthalate and the concentration of the germanium dioxide amounts to about 4,5% by weight based on TiO$_2$. After a gradual increase of temperature to 300° C followed by evacuation to 0.2 Torr in 15 minutes, the polycondensation reaction was finished after 3 hours. A highly viscous melted polyester is obtained.

ηrel =
m.p. = 292° to 249°C
remission
(at 460 mµ) = 78%
η300° = 3900 poises

What we claim is :

1. In the process for the production of high molecular weight linear polyesters which comprises polycondensing a glycol with terephthalic acid or a terephthalic acid ester in the presence of a catalyst the improvement comprising using as said catalyst titanium dioxide with from 0.01 to 20% by weight based on the titanium dioxide of a metal compound comprising an oxide, phosphate or sulfate of the metal zinc, cadmium, antimony, manganese, aluminum magnesium, germanium, lead or cobalt; said catalyst being added in the form of a suspension in glycol or an inert carrier in which the suspension contains 0.5 to 70% by weight of titanium dioxide; said catalyst being prepared prior to use in polycondensation by A. calcining titanium dioxide together with said metal compound; or by B. heating an aqueous suspension of titanium dioxide with a solution of a water soluble salt of the metal of said metal compound, precipitating said metal compound onto the titanium dioxide, washing and drying the product.

2. The process as claimed in claim 1, wherein said metal compound is germanium dioxide.

3. The process as claimed in claim 1, wherein said metal compound is zinc phosphate.

4. The process as claimed in claim 1, wherein said metal compound is an antimony oxide.

5. The process as claimed in claim 1, wherein said catalyst is a titanium dioxide calcined together with the metal compound.

6. The process of claim 1 in which the metal compound is an oxide and the metal compound is present in an amount of 0.1 to 5% by weight based on the titanium dioxide.

* * * * *